US006038341A

United States Patent [19]

Takeshima et al.

[11] Patent Number: 6,038,341

[45] Date of Patent: Mar. 14, 2000

[54] HISTOGRAM OPERATING UNIT FOR VIDEO SIGNALS

[75] Inventors: Masahiro Takeshima, Takatsuki; Atsuhisa Kageyama, Ibaraki; Minoru Kawabata, Takatsuki; Hiroko Sugimoto, Hirakata, all of Japan

[73] Assignee: Matsushita Electric Industrial Co., Ltd., Osaka, Japan

[21] Appl. No.: 09/034,857

[22] Filed: Mar. 4, 1998

[30] Foreign Application Priority Data

Mar. 6, 1997 [JP] Japan .................................... 9-051338

[51] Int. Cl.[7] ...................................................... G06T 5/40

[52] U.S. Cl. ............................................ 382/168; 348/672

[58] Field of Search .................................... 382/169, 170, 382/171, 172, 168; 348/672, 624, 607, 622, 678; 358/455; 702/180

[56] References Cited

U.S. PATENT DOCUMENTS

| | | | |
|---|---|---|---|
| 5,263,098 | 11/1993 | Horikami | 382/128 |
| 5,289,282 | 2/1994 | Tsuji et al. | 348/624 |
| 5,315,389 | 5/1994 | Izawa et al. | 348/672 |
| 5,394,194 | 2/1995 | Izawa et al. | 348/672 |
| 5,471,319 | 11/1995 | Ogawa | 358/445 |

FOREIGN PATENT DOCUMENTS

| | | |
|---|---|---|
| 0 501 728 | 9/1992 | European Pat. Off. . |
| 0 505 073 | 9/1992 | European Pat. Off. . |
| 0 516 084 | 12/1992 | European Pat. Off. . |
| 5-66751 | 3/1993 | Japan . |

*Primary Examiner*—Jon Chang
*Assistant Examiner*—Waymond C. Patrick
*Attorney, Agent, or Firm*—Ratner & Prestia

[57] ABSTRACT

A histogram operating unit comprises: histogram generator which receives input video signals, and creates a histogram of input video signals, a first limiter for receiving a histogram generated by the histogram generator and an externally set first limit level, and restricting the frequency of the histogram created by the histogram generator to within a specified level, and outputting a restricted histogram, a first totaling circuit for calculating the number of samples of video signals produced by the first limiter, second totaling circuit for calculating the number of samples of the input video signals, a first subtractor for subtracting the output of the first totaling circuit from the output of the second totaling circuit, and a corrected histogram generator which receives the output of the first limiter and the output of the first subtractor, and creates the corrected histogram.

5 Claims, 10 Drawing Sheets

HISTOGRAM OPERATING UNIT FOR VIDEO SIGNALS

FIELD OF THE INVENTION

The present invention relates to the field of histogram operating units for video signals.

BACKGROUND OF THE INVENTION

An image quality correction circuit using histogram illustrating distribution of television signal levels is disclosed in the Japanese Laid-open Patent No. H5-66751. FIG. 12 shows a block diagram of an image quality correction circuit of the aforementioned patent.

The image quality correction circuit comprises: a cumulative histogram circuit 81 for creating a histogram for each field of an input video signal and calculating a cumulative histogram from the created histograms, a first multiplier 82 for multiplying the output of the cumulative histogram circuit by a first constant, a normalization circuit 83 for dividing the output of the first multiplier 82 by the total number of samples, a correction circuit 84 for outputting a correction value for each picture element using the output of the normalization circuit 83 and the input video signal, a second multiplier 85 for multiplying the output of the correction circuit 84 by a second constant, and an adder 86 for adding the output of the second multiplier 85 and the input video signal. The image quality correction circuit as configured above virtually improves the contrast without depending on the performance of television sets by increasing the assignment of brightness on television sets corresponding to the interval of the most concentrated signal levels. This is accomplished by modifying the frequencies of the histogram of the input video signal.

The above configuration for an image quality correction circuit may result in excessive correction, because the histogram generated from the input video signal and unmodified is used. The generated histogram may be biased if the input video signals are concentrated near a certain level causing the slope of the cumulative histogram to be steep near this level. The steep slope affecting, in some cases, excessive correction such as intensified noise or unnatural images

SUMMARY OF THE INVENTION

A histogram operating unit of the present invention modifies histograms of input video signals producing a corrected histogram. Histograms of input video signals are balanced (averaged) when the input signals are concentrated at a certain level. In response to this concentration the frequencies of input signal levels are balanced to create a corrected histogram.

A histogram operating unit comprising: a histogram generator which receives input video signals, and creates a histogram of input video signals, a first limiter for receiving a histogram generated by the histogram generator and an externally set first limit level restricting the frequency of the histogram created by the histogram generator within a specified level, a first totaling circuit for calculating the number of samples of video signals received from the first limiter, a second totaling circuit for calculating the number of samples of the input video signals, a first subtractor for subtracting the output of the first totaling circuit from the output of the second totaling circuit, and a corrected histogram generator (histogram corrector) which receives the output of the first limiter and the output of the first subtractor and creates the corrected histogram.

DESCRIPTION OF THE PREFERRED EMBODIMENT

First Exemplary Embodiment

Figure 1:
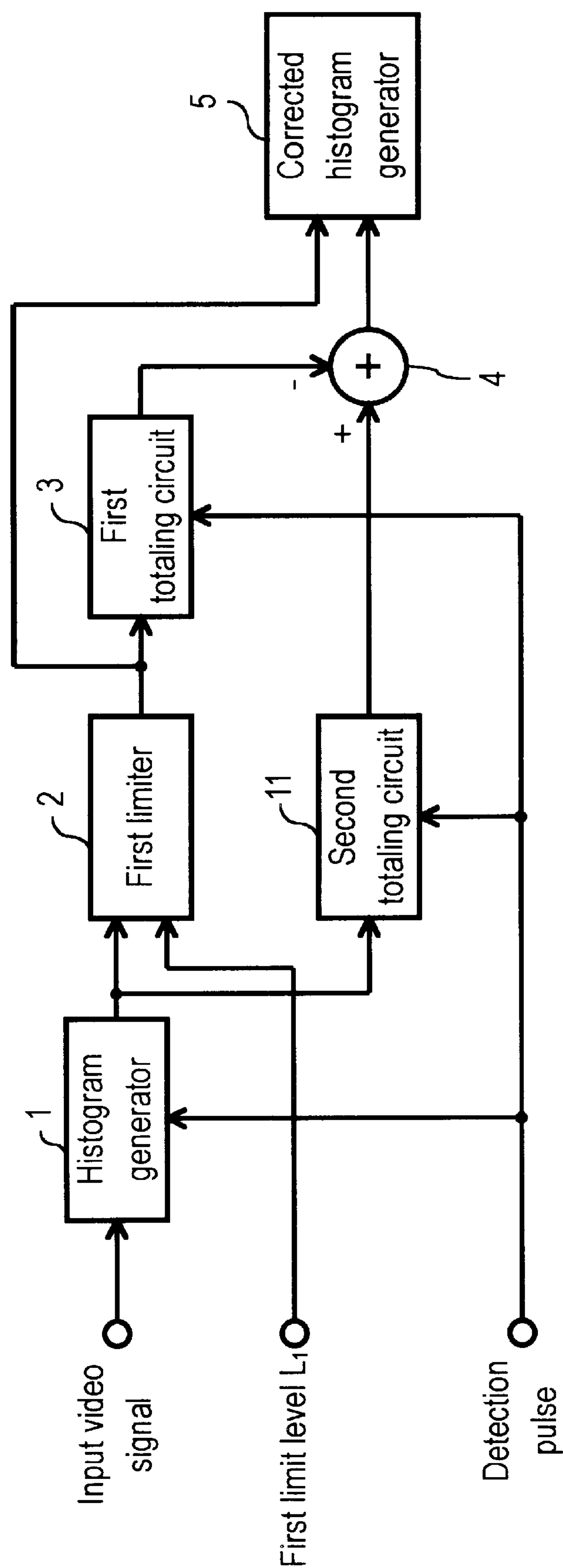
FIG. 1 is a block diagram of a histogram operating unit for video signals in accordance with a first exemplary embodiment.

FIG. 1 shows a block diagram of a histogram operating unit for video signals in a first exemplary embodiment of the present invention.

In FIG. 1, a histogram generator 1 receives a detection pulse and a video signal, and creates a histogram of the input video signal by judging within which of general intervals each video signal level belongs. The detection pulse is an externally applied input timing signal that indicates an inputting period for video signals to be sampled; from which the histogram is generated during one field or one frame. A histogram generated in the histogram generator 1 is called hereafter a raw histogram.

A first limiter 2 receives an externally set first limit level $L_1$ and the output of the histogram generator 1, and restricts the raw histogram to within the first limit level $L_1$. More specifically, the first limiter outputs $L_1$ if the output of the histogram generator 1 is greater than the first limit level $L_1$, and outputs the output of the histogram generator 1 unmodified if the output of the histogram generator 1 is the equal to or smaller than the first limit level $L_1$. In this way, the first limiter 2 outputs a histogram restricted by the first limit level $L_1$. A histogram restricted by the first limit level $L_1$ is called hereafter a restricted histogram.

A first totaling circuit 3 receives the output of the first limiter 2 and the detection pulse, and cumulatively adds the output of the first limiter 2 during the inputting period of the detection pulse. A second totaling circuit 11 receives the output of the histogram generator 1 and the detection pulse, and cumulatively adds the output of the histogram generator 1 during the inputting period of the detection pulse, to calculate the total sample numbers generated in the histogram generator 1. A subtractor 4 subtracts the output of the first totaling circuit 3 from the output of the second totaling circuit 11. A corrected histogram generator (histogram corrector) 5 receives the output of the first limiter 2 and the output of the first subtractor 4, and generates the corrected histogram from the restricted histogram, based on the output of the first subtractor 4.

The histogram correction means comprises: the first totaling circuit 3, the first subtractor 4, the second totaling circuit 11, and the corrected histogram generator (histogram corrector) 5. The histogram correction means corrects, by balancing or averaging the raw histogram in accordance with the difference between the total sample numbers of the raw histogram and the total sample numbers of the restricted histogram.

Figure 7A:
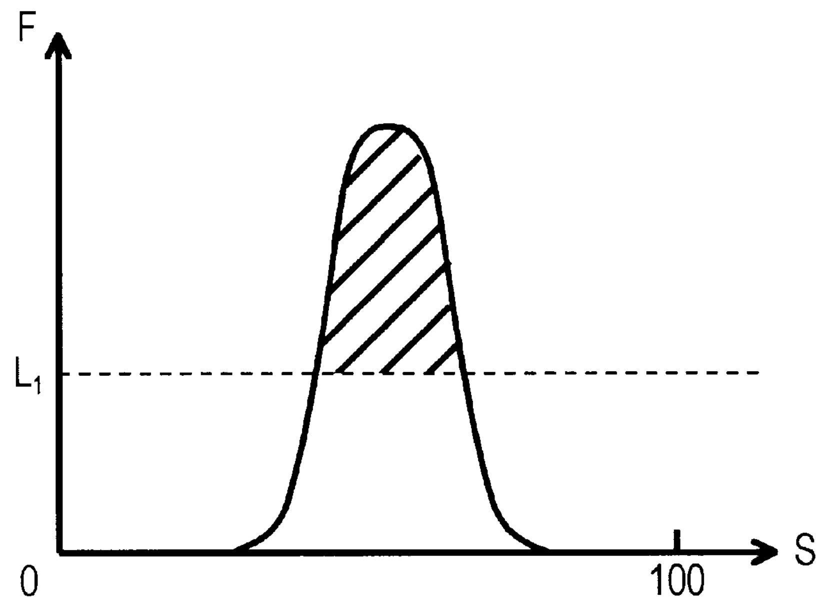
FIG. 7A is a histogram chart of video signals before correction in accordance with the first to sixth exemplary embodiments.

The operation of the histogram operating unit for video signals as configured above is explained next. First, the histogram generator 1 in FIG. 1 creates a histogram of input video signals during the inputting period of the detection pulse. The first limiter 2 receives the output of the histogram generator 1 and the first limit level $L_1$, and restricts the output of the histogram generator 1 within the externally set first limit level $L_1$. FIG. 7A shows how restriction takes place.

FIG. 7A shows a histogram of input video signals. The video signal level S of input video signals is plotted along the abscissa and the frequency F is plotted along the ordinate. $L_1$ is the externally set first limit level. The exemplary histogram in FIG. 7A shows a histogram in which signal values are concentrated at a certain signal level. The first limiter 2 therefore restricts the histogram to the first limit level $L_1$ to delete the shaded portion in FIG. 7A, and outputs the restricted histogram (the histogram without the shaded portion) to the first totaling circuit 3.

The first totaling circuit 3 receives the output of the first limiter 2 and the detection pulse, and calculates the total number of samples of video signals received from the first limiter 2 during the inputting period of the detection pulse. The second totaling circuit 11 receives the output of the histogram generator 1 and the detection pulse, and calculates the number of samples of video signals received from the histogram generator 1 during the inputting period of the detection pulse. The first subtractor 4 subtracts the output of the first totaling circuit 3 from the output of the second totaling circuit 11. Whether video signal levels of input video signals are concentrated or spread is detectable from the output of the first subtractor 4.

If the output of the first subtractor 4 is small, it indicates that input video signals cover a wide range between black and white. If the output of the first subtractor 4 is large, it indicates that the distribution of the video signal levels is concentrated. FIG. 7A shows the case when the distribution of the video signal levels is concentrated.

Figure 7B:
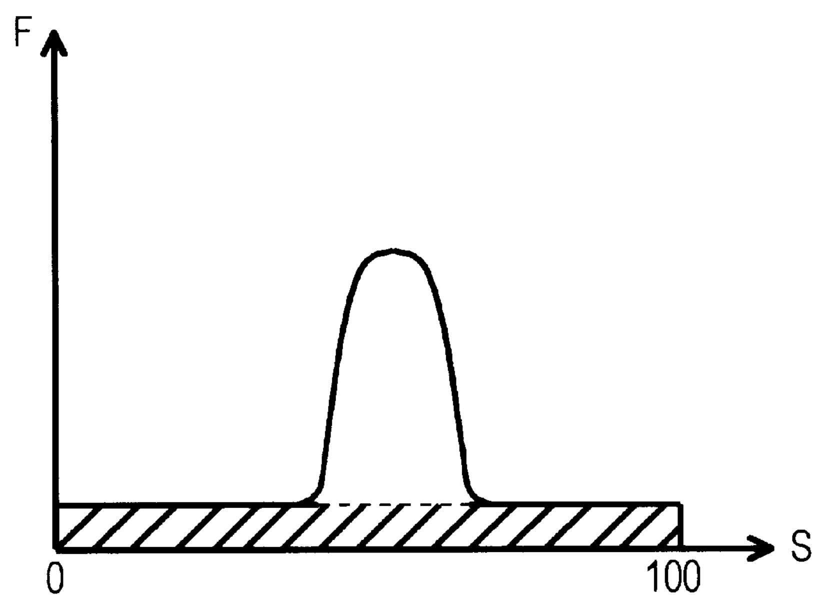
FIG. 7B is a histogram chart of video signals after correction in accordance with the first to sixth exemplary embodiments.

The corrected histogram generator (histogram corrector) 5 receives the output of the first limiter 2 and the output of the first subtractor 4, and generates the corrected histogram. FIG. 7B shows the corrected histogram. More specifically, the corrected histogram generator (histogram corrector) 5 uniformly adds the number of samples represented by the shaded portion in FIG. 7A, which has been deleted, to the restricted histogram in FIG. 7A to create the histogram shown in FIG. 7B. The area of the shaded portion in FIG. 7A is equal to the area of the shaded portion in FIG. 7B.

As a result, the corrected histogram will have a more balanced (averaged) shape; since the output of the first subtractor 4 becomes large in response to a concentration in the distribution of video signal levels.

As explained above, the histogram operating unit in this exemplary embodiment enables the creation of a balanced histogram by correcting generated histograms in response to the degree of concentration of input video signals at a certain level. The downstream image quality correction (not illustrated) circuit thus becomes capable of virtually improving the contrast without depending on the performance of television sets by cumulating balanced histograms to create a cumulative histogram, correcting the input/output video signal characteristic, and increasing the assignment of brightness on television sets corresponding to the interval of the most concentrated signal levels. Accordingly, the present invention avoids intensified noise or unnatural corrected video images from interfering with the operation of the downstream image quality correction circuit due to an unbalanced raw histogram.

Second Exemplary Embodiment

Figure 2:
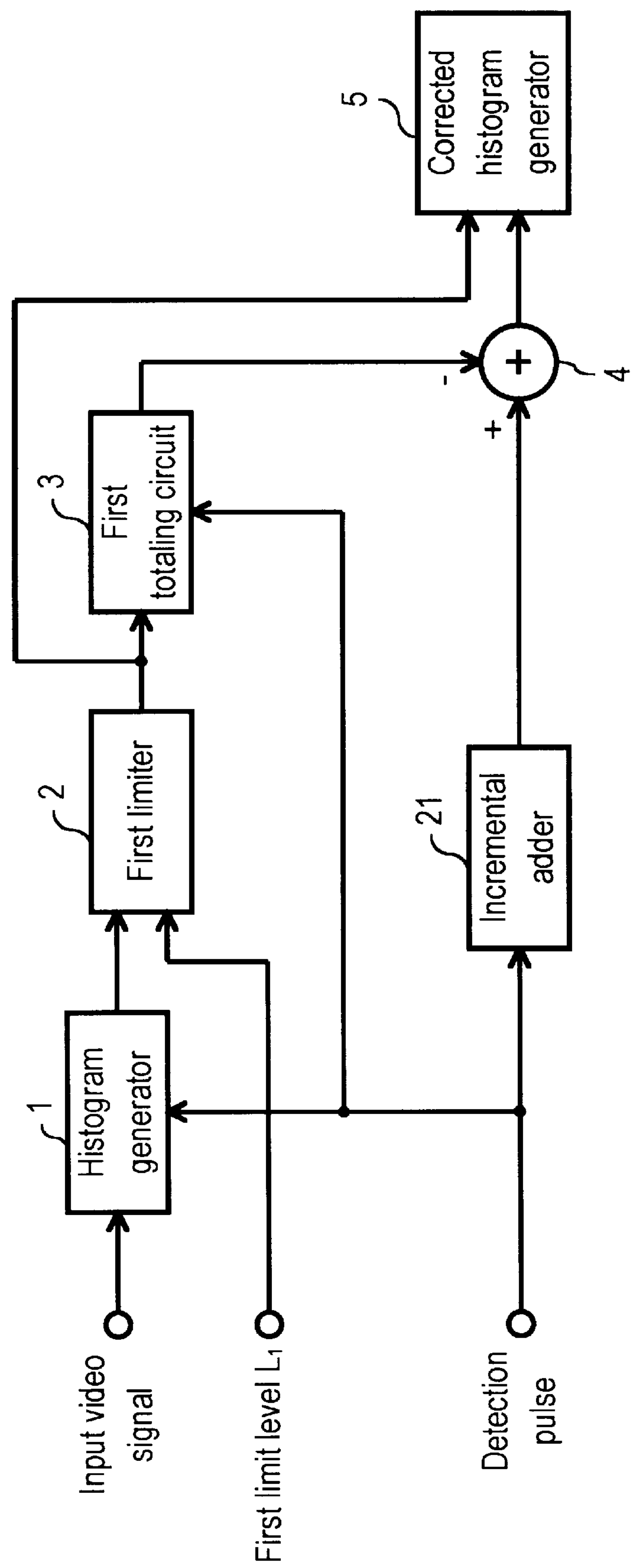
FIG. 2 is a block diagram of a histogram operating unit for video signals in accordance with a second exemplary embodiment.

FIG. 2 shows a block diagram of a histogram operating unit for video signals in a second exemplary embodiment.

In FIG. 2, a difference with the configuration of the first exemplary embodiment is that an incremental adder 21 is provided instead of the second totaling circuit 11 for receiving the detection pulse and calculating the total number of samples of video signals. The other configurations and operations are the same as in the first exemplary embodiment, and thus their explanation is omitted.

The configuration and operation of the histogram operating unit for video signals as configured above is explained next. The incremental adder 21 receives the detection pulse, and calculates the total number of samples of video signals during the inputting period of the detection pulse by calculating the number clock pulses applied(not illustrated). Next, the first subtractor 4 subtracts the output of the first totaling circuit 3 from the output of the incremental adder 21.

The corrected histogram generator (histogram corrector) 5 adds the total number of samples representing the shaded portion in FIG. 7A to the restricted histogram in FIG. 7A to create the histogram shown in FIG. 7B.

Figure 3:
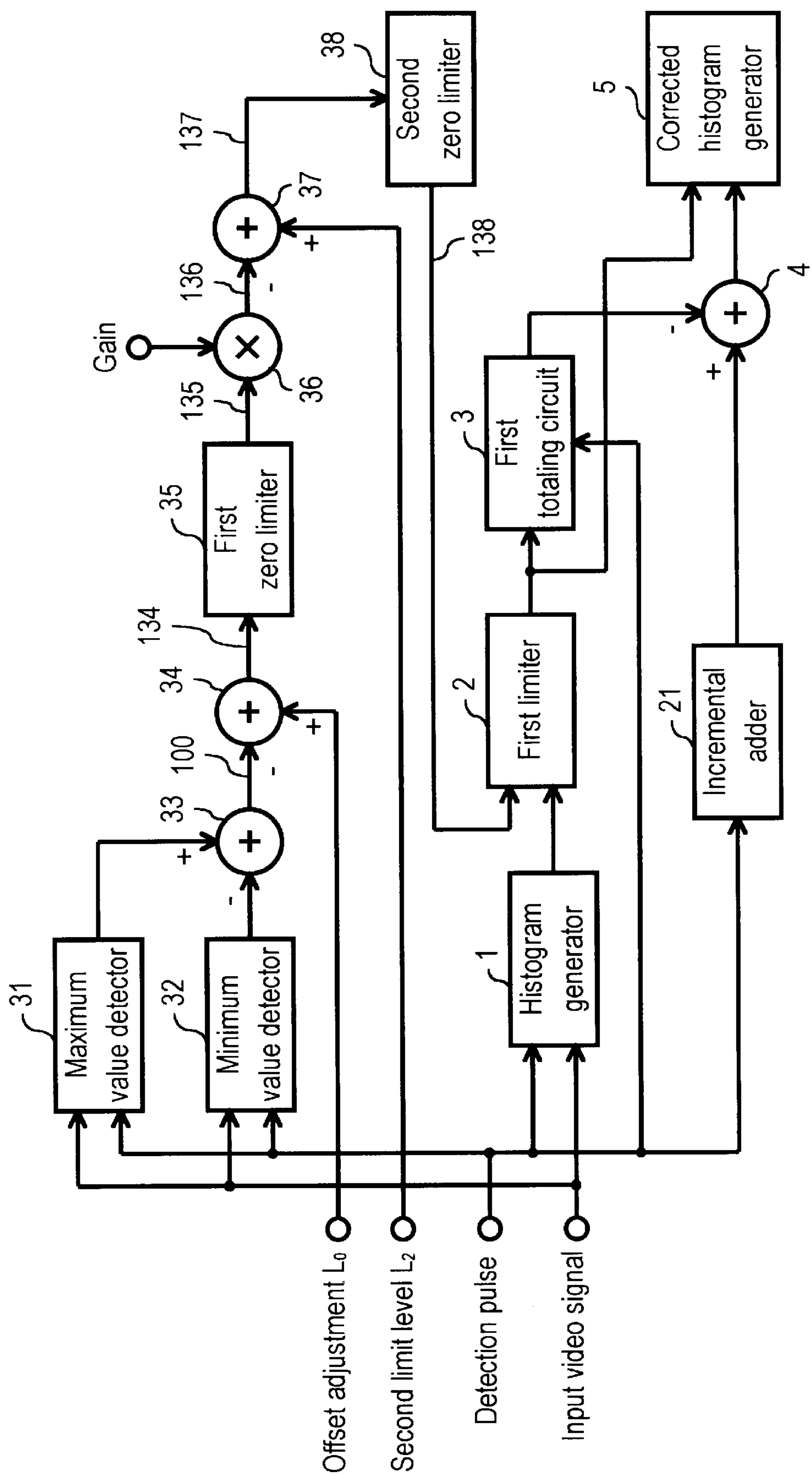
FIG. 3 is a block diagram of a histogram operating unit for video signals in accordance with a third exemplary embodiment.

As explained above, the histogram operating unit in this exemplary embodiment have the same effect as that of the first exemplary embodiment Third Exemplary Embodiment FIG. 3 shows a block diagram of a histogram operating unit for video signals in a third exemplary embodiment of the present invention.

In FIG. 3, a difference with the configuration of the second exemplary embodiment is that the third exemplary embodiment further comprises a maximum value detector 31 for detecting a maximum value in video signals during the inputting period of the detection pulse, a minimum value detector 32 for detecting a minimum value in video signals during the inputting period of the detection pulse, a second subtractor 33 for subtracting the output of the minimum value detector 32 from the output of the maximum value detector 31, a third subtractor 34 for subtracting the output of the second subtractor 33 from an externally set offset adjustment value $L_0$, a first zero limiter 35 for outputting zero (0) if the output of the third subtractor 34 is a negative value, and, otherwise the output of the third subtractor 34, unmodified, a multiplier 36 for multiplying the output of the first zero limiter 35 by an externally set gain, a fourth subtractor 37 for subtracting the output of the first multiplier 36 from an externally set second limit level $L_2$; and a second zero limiter 38 for outputting zero (0) if the output of the fourth subtractor 37 is a negative value, and, otherwise, the output of the fourth subtractor 37 unmodified The other configurations and operations are the same as the second exemplary embodiment, and thus their explanation is omitted.

The operation of the histogram operating unit for video signals as configured above is explained next.

In FIG. 3, the maximum value detector 31 detects the maximum value in the video signals during the inputting period of the detection pulse. The minimum value detector 32 detects the minimum value in the video signals during the inputting period of the detection pulse. The second subtractor 33 subtracts the output of the minimum value detector 32 from the output of the maximum value detector 31 and outputs the subtracted value X to the third subtractor 34. Therefore the output value X of the second subtractor 33 is a difference between the maximum and minimum values of the input video signal. The detected maximum and minimum values are updated during an inputting period of the detection pulse. In other words the maximum and minimum values detected during a period of one field is for example used during the succeeding field.

Figure 8:
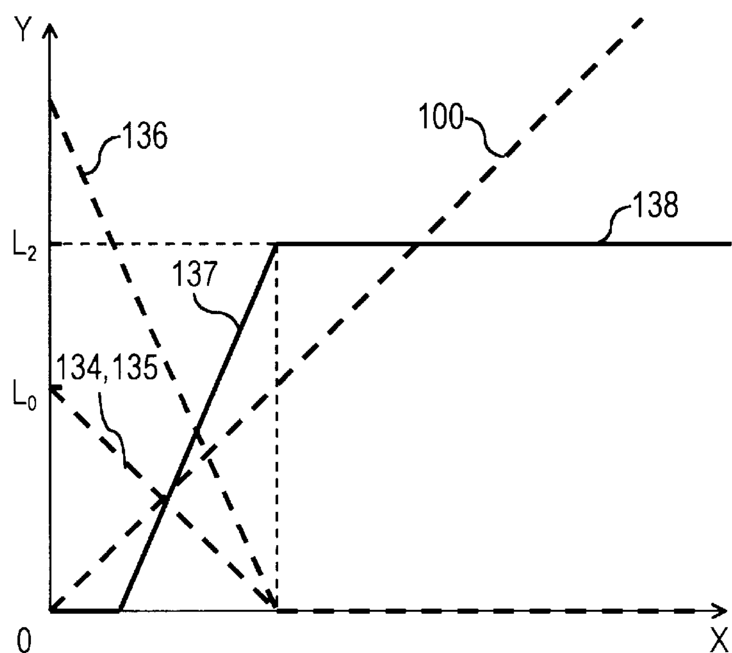
FIG. 8 is a collection of graphs useful in explaining the operation of the third exemplary embodiment of the present invention.

FIG. 8 shows an order of creating the limit levels in accordance with the exemplary embodiment of the present invention.

In FIG. 8, the output value of the second subtractor 33 is plotted along the abscissa X. The size of the output 100 of the second subtractor 33, output 134 of the third subtractor 34, output 135 of the first zero limiter 35, output 136 of the multiplier 36, output 137 of the fourth subtractor 37, and output 138 of the second zero limiter 38 are plotted along the ordinate Y.

The distribution of input video signals can be to at least to some extent estimated based on the output of the second subtractor 33. If the output 100 of the second subtractor 33 is large, it indicates that input video signals cover the wide range between black and white. If the output of the second subtractor 33 is small, it indicates that the distribution of video signal levels is concentrated at a certain video signal level.

In this exemplary embodiment it is assumed that the distribution of input video signals can be well estimated based on the output of the second subtractor 33.

The third subtractor 34 subtracts the output 100 of the second subtractor 33 from the externally set offset adjustment value $L_0$, and outputs the subtracted value shown in a dashed line 134 in FIG. 8.

The first zero limiter 35 sets the output 135 of the first zero limiter, 35 to zero (0) if the output 134 of the third subtractor 34 is negative, and, otherwise, the output 135 is set to the output of the third subtractor 34 unmodified; the subtracted value 135 is shown in a dashed line in FIG. 8.

The multiplier 36 multiplies the output 135 of the first zero limiter by an externally set gain. As a result of this multiplication, the output of the multiplier 36, namely 136, is shown in a dashed line in FIG. 8.

The fourth subtractor 37 subtracts the output 136 of the multiplier 36 from the externally set limit level $L_2$.

The second zero limiter 38 outputs zero if the output value of the fourth subtractor 37 is negative value, and, otherwise, it outputs the value of the fourth subtractor 37, unmodified. Accordingly, the output of the second zero limiter 38 creates the solid line 138 in FIG. 8.

The output 138 of the second zero limiter 38, as generated above, is supplied to the first limiter 2. The output 138 of the second zero limiter 38, as generated above, is utilized as the first limit level $L_1$ in the second exemplary embodiment.

The first limiter 2 receives the output 138 of the second zero limiter 38 and the output of the histogram generator 1.

As shown by the shaded portion in FIG. 7B, the output of the first subtractor 4 is added to the entire range of the output of the first limiter 2 for balancing the histogram.

As described above in the present exemplary embodiment the output 138 of the second zero limiter 38 is utilized as the first limit level $L_1$ as in the second exemplary embodiment. The first limit level $L_1$ is zero if the difference between the maximum value and the minimum value of the input video signal is small as shown by the solid line 138 in FIG. 8. The first limit level $L_1$ is equal to the second limit level $L_2$ if the difference between the maximum value and the minimum value of the input video signal is large as shown by the solid line 138 in FIG. 8. The first limit level $L_1$ is equal to the value between zero and the second limit level $L_2$ if the difference between the maximum value and the minimum value of the input video signal takes value between those described in the above two cases as shown by the solid line 138 in FIG. 8.

If the distribution of video signal levels is very concentrated in a specific level, the first limit level $L_1$ is zero as shown by the solid line 138 in FIG. 8 and the output of the corrected histogram is averaged as in FIG. 7B; as the difference between the maximum value and the minimum value of the input signal is small. On the other hand, if the distribution of video signal levels covers the wide range between black and white, the first limit level $L_1$ is equal to the second limit level $L_2$ and the corrected histogram is largely unchanged.

As described above in the present exemplary embodiment a corrected histogram can be created according to the difference between the maximum value and the minimum value of the input signal.

Fourth Exemplary Embodiment

Figure 4:
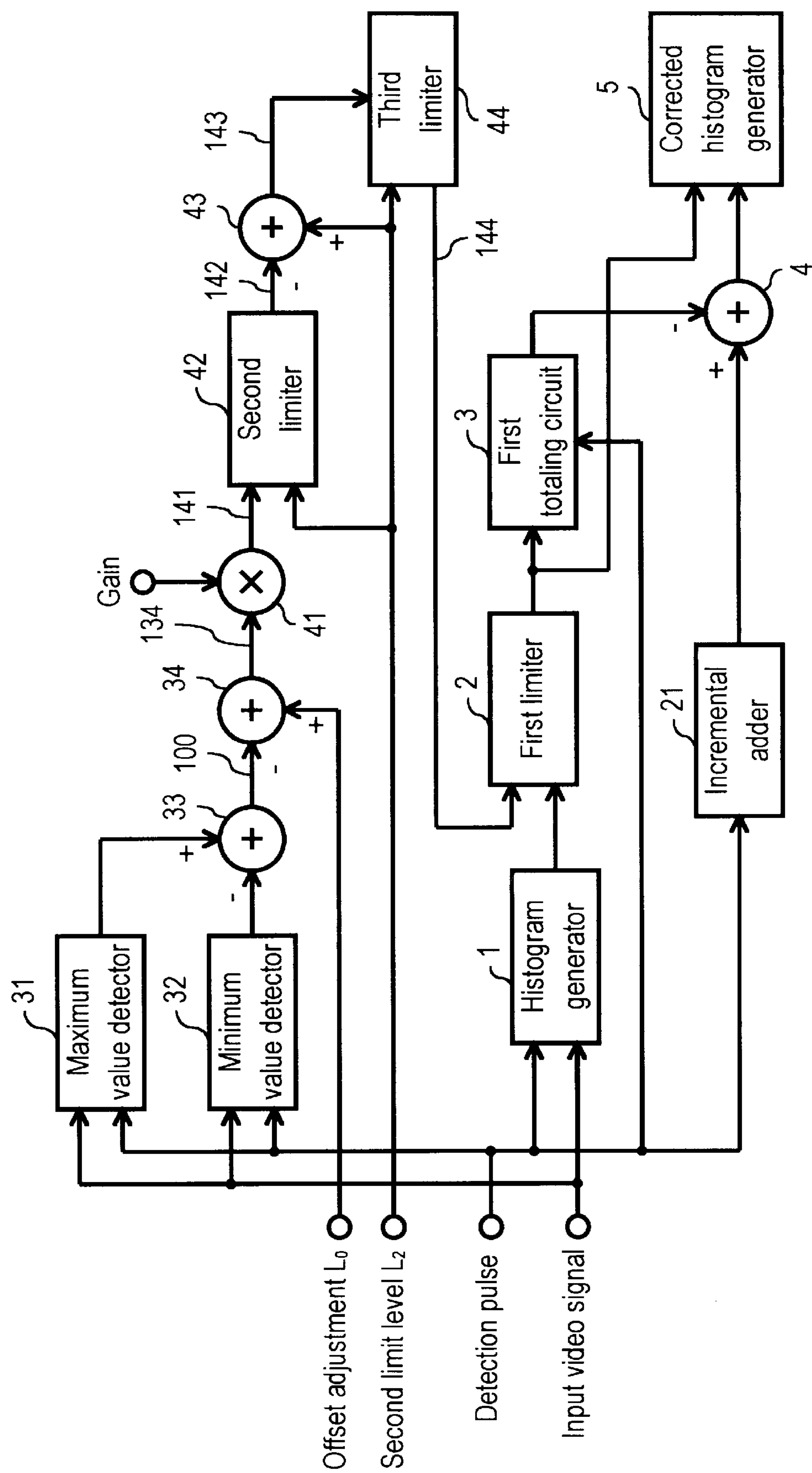
FIG. 4 is a block diagram of a histogram operating unit for video signals in accordance with a fourth exemplary embodiment.

FIG. 4 shows a block diagram of a histogram operating unit for video signals in a fourth exemplary embodiment of the present invention.

In FIG. 4, a difference with the third exemplary embodiment is that the present exemplary embodiment further comprises a second multiplier 41, a second limiter 42, a fifth subtractor 43, and a third limiter 44 in FIG. 4 instead of the first zero limiter 35, the first multiplier 36, the fourth subtractor 37, and the second zero limiter 38 in FIG. 3. The other components are the same as in the third exemplary embodiment, and thus their explanation is omitted.

Figure 9:
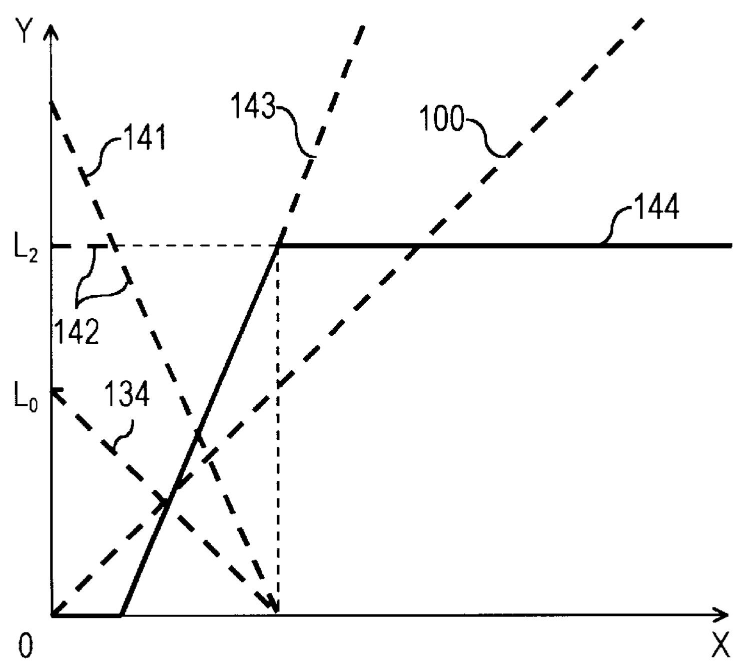
FIG. 9 is a collection of graphs useful in explaining the operation of the fourth exemplary embodiment of the present invention.

The second multiplier 41 multiplies the output 134 shown in a dashed line in FIG. 9 of the third subtractor 34 by an externally set gain. The output value of the second multiplier 41 is shown in the dashed line 141 in FIG. 9.

The second limiter 42 receives the output 141 of the second multiplier 41 and an externally set second limit level $L_2$ and outputs the second limit level $L_2$ if the output value 141 of the second multiplier 41 is greater than the output value of the second limit level $L_2$ and outputs the output value of the second multiplier 41 if the output value of the second multiplier 41 is not greater than the second limit level $L_2$. The output value of the second limiter 42 is shown in dashed line 142 in FIG. 9.

The fifth subtractor 43 subtracts the output 142 of the second limiter 42 from an externally set second limit level $L_2$ and outputs the subtracted value to the third limiter 44. The output value of the fifth subtractor 43 is shown in a dashed line 143 in FIG. 9.

The third limiter 44 receives the output value 143 of fifth subtractor 43 and the second limit level $L_2$ and outputs the second limit level $L_2$ if the output 143 of the fifth subtractor 43 is greater than the second limit level $L_2$ and outputs the output value 143 of the fifth subtractor 43 if the output value 143 of the fifth subtractor 43 is not greater than the second limit level $L_2$. The output value 144 of the third limiter 44 is shown in a solid line 144 in FIG. 9.

The first limiter 2 received the output 144 of the third limiter 44 and the output of the histogram generator 1.

As described above the present exemplary embodiment produces the same effect as that of the third exemplary embodiment and generates a corrected histogram according to the difference between the maximum value and the minimum value of the input video signal.

Fifth Exemplary Embodiment

Figure 5:
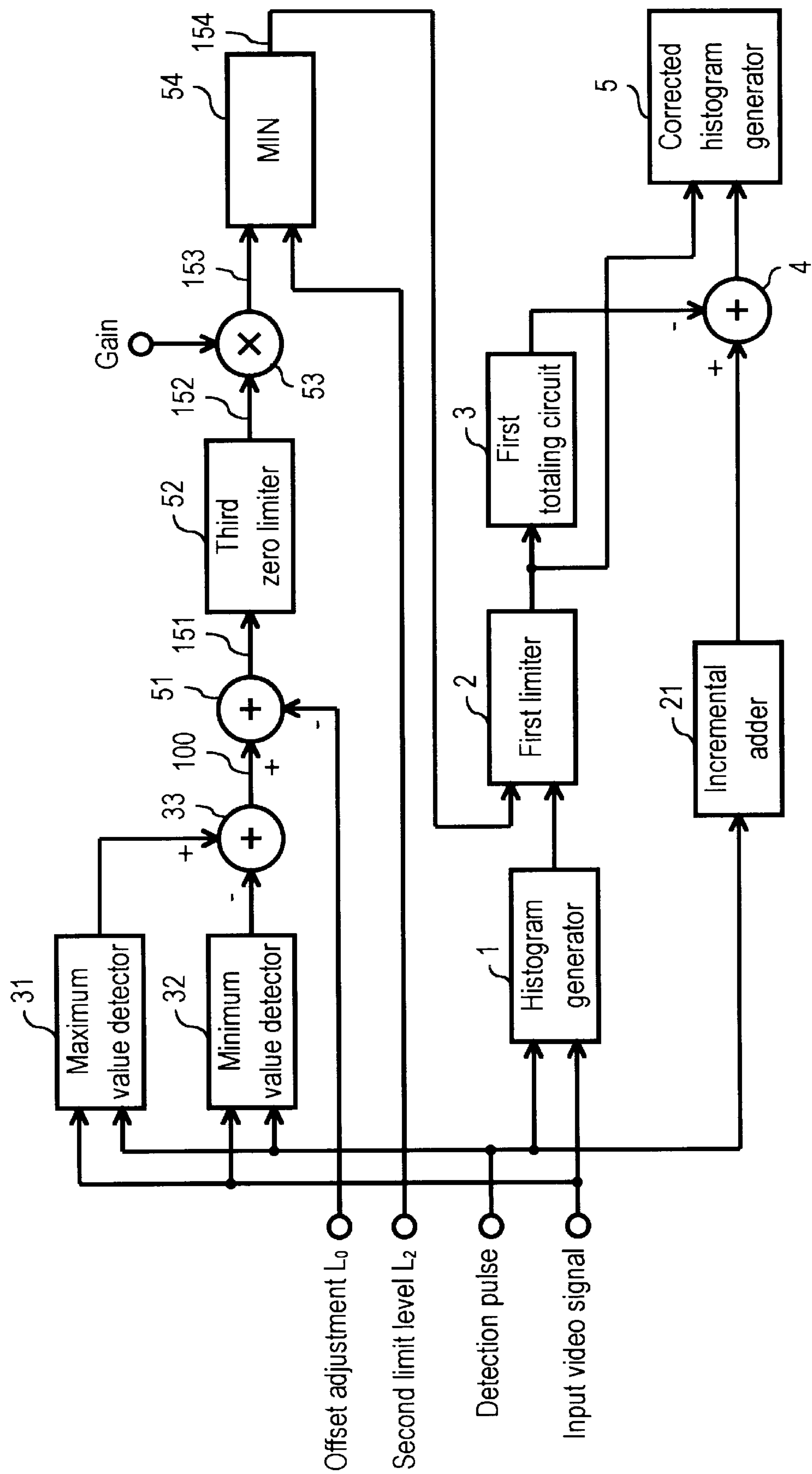
FIG. 5 is a block diagram of a histogram operating unit for video signals in accordance with a fifth exemplary embodiment.

FIG. 5 shows a block diagram of a histogram operating unit for video signals in a fifth exemplary embodiment of the present invention.

In FIG. 5, a difference with the third exemplary embodiment is that the present exemplary embodiment further comprises a sixth subtractor 51, a third zero limiter 52, a third multiplier 53, and a minimum circuit (MIN) 54 in FIG. 5 instead of the first zero limiter 35, the first multiplier 36, the fourth subtractor 37, and the second zero limiter 38 in FIG. 3. The other components are the same as the third exemplary embodiment, and thus their explanation is omitted.

The sixth subtractor 51 subtracts an externally set offset adjustment value $L_0$ from the output 100 of the second subtractor 33.

Figure 10:
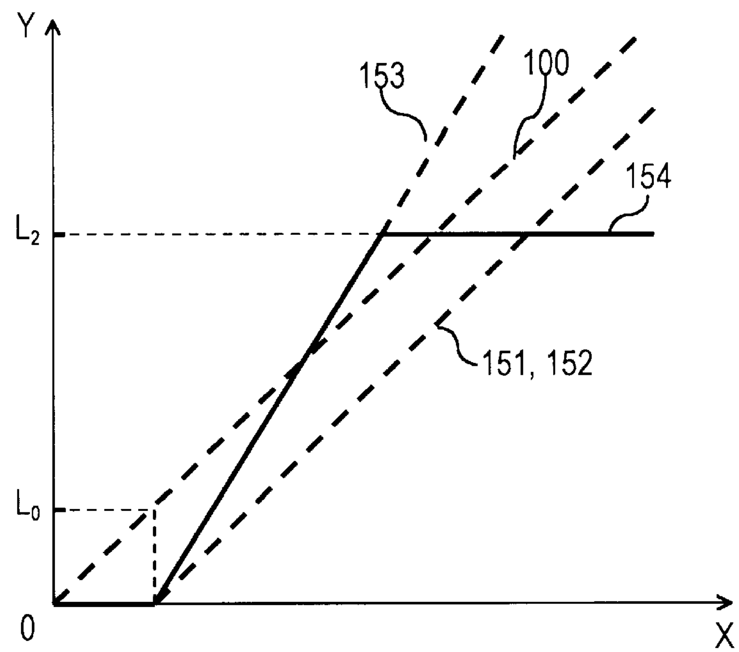
FIG. 10 is a collection of graphs useful in explaining the operation of the fifth exemplary embodiment of the present invention.

The third zero limiter 52 outputs zero (0) if the output of the sixth subtractor 51 is negative, and, otherwise, it outputs the output value of the sixth subtractor 51 unmodified. The output value of the third zero limiter 52 shown in a dashed line 152 in FIG. 10.

The third multiplier 53 multiplies the output 152 of the third zero limiter 52 by an externally set gain. The output value of the third multiplier 53 is shown in a dashed line 153 in FIG. 10.

The minimum circuit (MIN) 54 compares an externally set second limit level $L_2$ with the output 153 of the third multiplier 53 and outputs the smaller. The output value 154 of the minimum circuit (MIN) 54 is shown in a solid line 154 in FIG. 10.

The first limiter 2 receives the output 154 of the minimum circuit (MIN) 54 and the output of the histogram generator 1.

As described above the present exemplary embodiment produces the same effect as that of the third exemplary embodiment and generates a corrected histogram according to the difference between the maximum value and the minimum value of the input video signal.

Sixth Exemplary Embodiment

Figure 6:
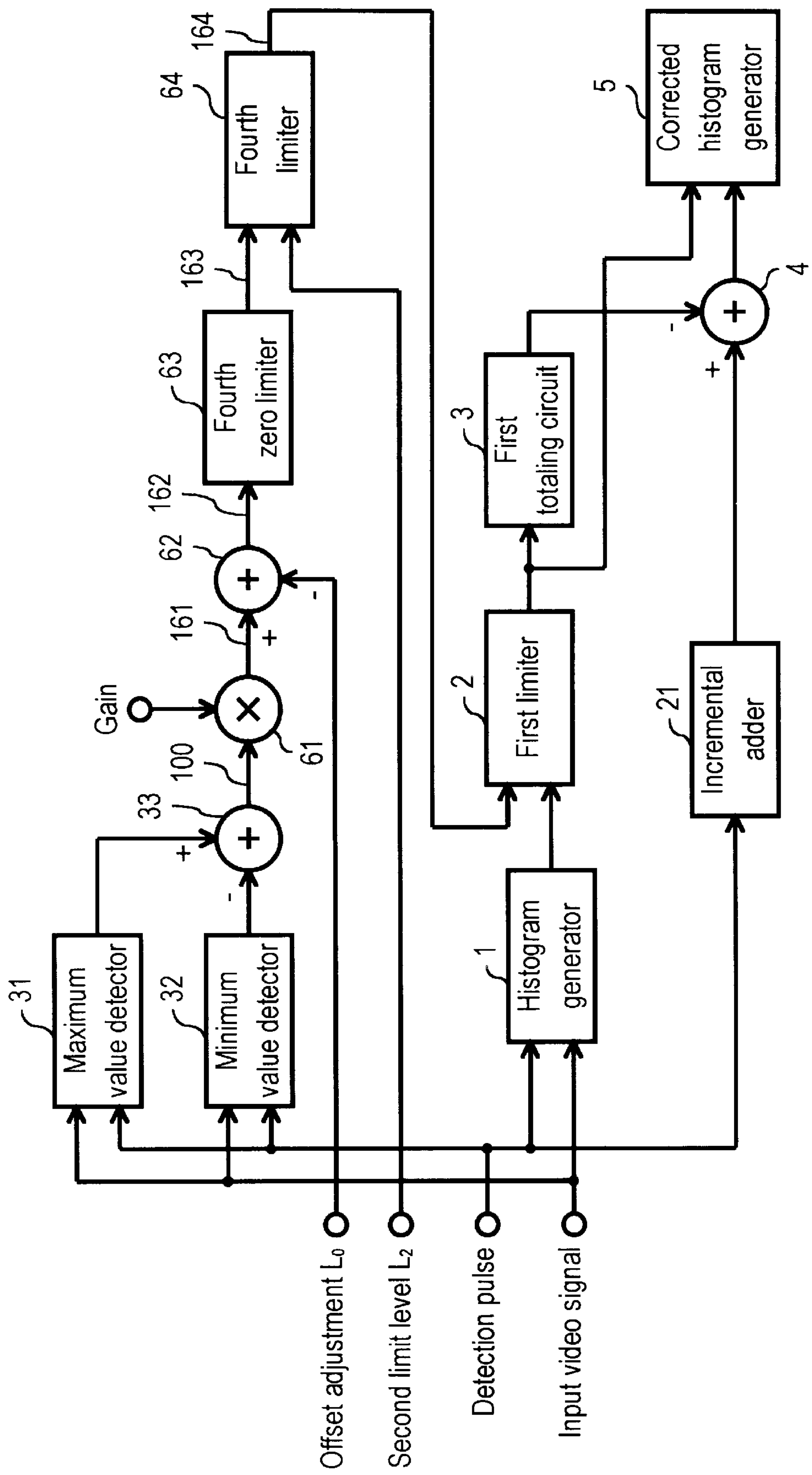
FIG. 6 is a block diagram of a histogram operating unit for video signals in accordance with a sixth exemplary embodiment.

FIG. 6 shows a block diagram of a histogram operating unit for video signals in a sixth exemplary embodiment of the present invention.

In FIG. 6, a difference with the third exemplary embodiment is that the present exemplary embodiment further comprises a fourth multiplier 61, a seventh subtractor 62, a fourth zero limiter 63, and a fourth limiter 64 in FIG. 6 instead of the first zero limiter 35, the first multiplier 36, the fourth subtractor 37, and the second zero limiter 38 in FIG. 3. The other components are the same as the third exemplary embodiment, and thus their explanation is omitted.

Figure 11:
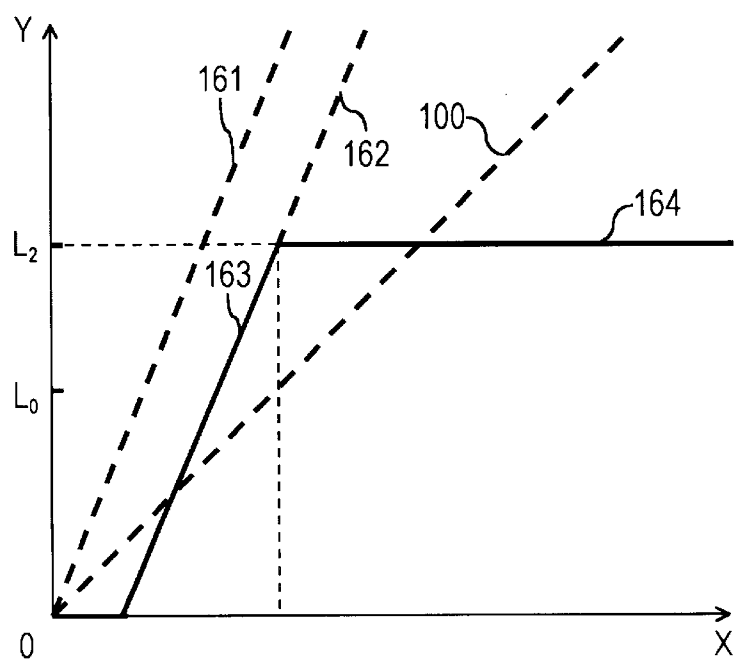
FIG. 11 is a collection of graphs useful in explaining the operation of the sixth exemplary embodiment of the present invention.
Figure 12:
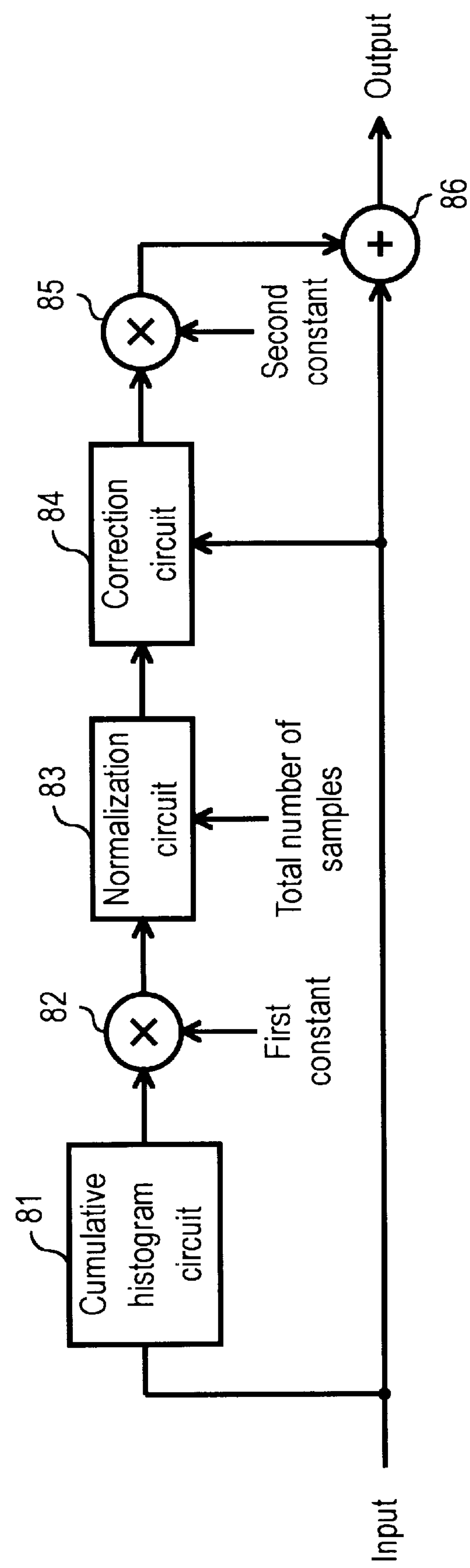
FIG. 12 is a block diagram of a conventional image quality correction circuit using a histogram of video signals.

The fourth multiplier 61 multiplies the output 100 of the second subtractor 33 by an externally set gain. The output value of the fourth multiplier 61 is shown in a dashed line 161 in FIG. 11.

The seventh subtractor 62 subtracts an externally set offset adjustment value $L_0$ from the output 161 of the fourth multiplier 61. The output value of the seventh subtractor 62 is shown in a dashed line 162 in FIG. 11

The fourth zero limiter 63 output zero (0) if the outputs 162 of the seventh subtractor 62 is negative, and, otherwise, a subtracted value 162 is outputted unmodified.

The fourth limiter 64 receives the output of the fourth zero limiter 63 and an externally set second limit level $L_2$ and outputs the smaller. The output value 164 of the fourth limiter 64 is shown by a solid line 164 in FIG. 11.

The first limiter 2 receives the output 164 of the fourth limiter 64 and the output of the histogram generator 1.

As described above the present exemplary embodiment produces the same effect as that of the third exemplary embodiment and generates a corrected histogram according to the difference between the maximum value and the minimum value of the input video signal.

Industrial Applicability

As explained above, the histogram operating unit of the present invention enables the correction (balancing) of histograms in response to the degree of concentration of input video signals at a certain level. Accordingly, the present invention prevents excessive correction of video signals by an image quality correction block in the downstream process. Histogram operating units are employed in television sets and other display monitors.

In the third to sixth exemplary embodiments, four exemplary embodiments were described each of which generates a corrected histogram according to the difference between the maximum value and the minimum value of the input video signal. It is apparent that many other configurations of the histogram operating unit other than the above exemplary embodiments are feasible. The preferred embodiments described herein are therefore illustrative and not restrictive. The scope of the invention being indicated by the appended claims and all modifications which come within the true spirit of the claims are intended to be embraced therein.

What is claimed is:

1. A histogram operating unit comprising:

histogram generation means for generating a raw histogram of the contents of an input video signal and outputting said raw histogram, said raw histogram defined by a plurality frequencies;

first limit means for generating a restricted histogram by receiving said raw histogram and a predetermined first limit level and restricting said plurality of frequencies defining said raw histogram by said predetermined first limit level, said restricted histogram defined by a plurality of restricted frequencies; and histogram correction means for performing a mathematical operation on said raw histogram based on a first difference between a summation together of said plurality of frequencies defining said raw histogram and a summation together of said plurality of restricted frequencies defining said restricted histogram.

2. A histogram operating unit as defined in claim 1, wherein said first limit means produces a first output, and said histogram correction means comprises:

first totaling means for totaling together said plurality of restricted frequencies defining said restricted histogram and outputting a first total;

second totaling means for totaling together said plurality of frequencies defining said raw histogram and outputting a second total;

first subtraction means for subtracting said first total from said second total and outputting a second difference, and said histogram correction means outputs a corrected histogram based on said first output of said first limit means and said second difference.

3. A histogram operating unit comprising:

histogram generation means for generating a raw histogram of the contents of an input video signal and outputting said raw histogram, said raw histogram defined by a plurality of frequencies;

maximum value detection means for detecting a maximum value of the contents of said input video signal;

minimum value detection means for detecting a minimum value of the contents of said input video signal;

subtraction means for subtracting said minimum value from said maximum value and outputting a second difference;

output means for receiving said second difference and a predetermined offset adjustment value and a predetermined first limit level, and producing a second limit level, said second limit level ranging in value from zero to said first limit level;

first limit means for generating a restricted histogram by receiving said raw histogram and said second limit level and restricting said plurality of frequencies defining said raw histogram by said second limit level, said restricted histogram defined by a plurality of restricted frequencies; and histogram correction means for performing a mathematical operation on said raw histogram based on a first difference between a summation together of said plurality of frequencies defining said raw histogram and a summation together of said plurality of restricted frequencies defining said restricted histogram.

4. The histogram operating unit as defined in claim 3, wherein said maximum value detection means detects the maximum value during a first period, and said maximum value detection means outputs said maximum value during a second period, the second period succeeding the first period, and said minimum value detection means detects the minimum value during the first period and said minimum value detection means outputs said minimum value during the second period.

5. A histogram operating unit as defined in claim 1, wherein said histogram correction means produces a corrected histogram by adding an average difference between said plurality of frequencies defining said raw histogram and said plurality of restricted frequencies defining said restricted histogram to each of said plurality of restricted frequencies.

* * * * *